United States Patent
Balaguru et al.

(10) Patent No.: US 12,091,369 B2
(45) Date of Patent: *Sep. 17, 2024

(54) PROTECTIVE COATINGS FOR CONCRETE

(71) Applicant: Zirconia Inc., Tukwila, WA (US)

(72) Inventors: Balamuralee Venkatesalu Balaguru, Seattle, WA (US); Benjamin Theodore Cook, Seattle, WA (US)

(73) Assignee: Zirconia Inc., Tukwila, WA (US)

( * ) Notice: Subject to any disclaimer, the term of this patent is extended or adjusted under 35 U.S.C. 154(b) by 826 days.

This patent is subject to a terminal disclaimer.

(21) Appl. No.: 16/870,728

(22) Filed: May 8, 2020

(65) Prior Publication Data

US 2020/0354281 A1    Nov. 12, 2020

Related U.S. Application Data

(60) Provisional application No. 62/845,378, filed on May 9, 2019.

(51) Int. Cl.
| | | |
|---|---|---|
| *C04B 41/50* | (2006.01) | |
| *C04B 28/26* | (2006.01) | |
| *C09D 1/00* | (2006.01) | |

(52) U.S. Cl.
CPC .......... *C04B 41/5089* (2013.01); *C04B 28/26* (2013.01); *C04B 41/502* (2013.01); *C04B 41/5085* (2013.01); *C04B 41/509* (2013.01); *C09D 1/00* (2013.01)

(58) Field of Classification Search
CPC .......... C09D 1/00; C09D 5/031; C09D 5/033; C09D 5/08; C09D 7/61; C09D 7/69; C09D 7/70; C09D 5/084; C09D 1/02; C09D 7/67; B05D 7/14; B05D 7/24; B05D 2401/32; C23C 2/26; C23C 28/00; C08K 3/22; C08K 7/02; C04B 2111/00482; C04B 2103/54; C04B 20/006; C04B 18/082; C04B 20/008; C04B 14/4631; C04B 14/4625; C04B 14/386; C04B 14/30; C04B 41/5041; C04B 41/5024; C04B 14/465; C04B 14/305

USPC .............. 428/446; 427/397.7; 106/635, 632, 106/287.17, 286.6, 286.4, 286.5, 286.1

See application file for complete search history.

(56) References Cited

U.S. PATENT DOCUMENTS

| | | | |
|---|---|---|---|
| 8,129,461 B2 * | 3/2012 | Xenopoulos | C04B 28/26 524/588 |
| 8,197,593 B2 | 6/2012 | Balaguru | |
| 2020/0354580 A1 | 11/2020 | Balaguru et al. | |
| 2020/0354581 A1 | 11/2020 | Balaguru et al. | |
| 2021/0214464 A1 * | 7/2021 | Matsusue | C08L 1/02 |

FOREIGN PATENT DOCUMENTS

| | | | | |
|---|---|---|---|---|
| GB | 1595480 A | * | 8/1981 | C09D 5/18 |
| KR | 20060102710 A | * | 9/2006 | |

OTHER PUBLICATIONS

Machine translation of KR 20060102710 A, originally published Sep. 2006 to Jung et al. (Year: 2006).*
Gunduz, Engineering properties of amorphous silica as a new natural pozzolan for use in concrete, 2005, Cement and Concrete Research, 35, 1251-1261 (Year: 2005).*

* cited by examiner

*Primary Examiner* — Stefanie J Cohen
*Assistant Examiner* — Ritu S Shirali
(74) *Attorney, Agent, or Firm* — Alan G. Towner; Leech Tishman Fuscaldo & Lampl

(57) ABSTRACT

Inorganic coatings that may be used to coat and protect concrete are disclosed. The protective inorganic coatings include a liquid composition portion comprising water, an alkali metal oxide component and a silicate-containing component. The coatings also include a powder composition portion comprising microspheres, metal oxide powder and optional microfibers. When applied to concrete, the coatings provide chemical and physical protection.

17 Claims, No Drawings

PROTECTIVE COATINGS FOR CONCRETE

CROSS-REFERENCE TO RELATED APPLICATION

This application claims the benefit of U.S. Provisional Patent Application Ser. No. 62/845,378 filed May 9, 2019, which is incorporated herein by reference.

FIELD OF THE INVENTION

The present invention relates to protective coatings, and more particularly relates to protective inorganic coating compositions that may be applied to concrete.

BACKGROUND INFORMATION

Concrete is a composite of Portland cement powder, sand, gravel and water. Approximately 20 weight percent of concrete comprises cement powder that forms a gel phase binder when water is added, which holds the concrete together. Sand and rock generally comprise stable elements. However, the cement binder cures with the addition of water to form a disordered calcium silicate hydrate (C—S—H) which lacks defined crystalline structure and is vulnerable to environmental attack. Commonly, calcium is attacked by carbonate in humidity which forms carbonic acid, then in turn, reacts to form calcium carbonate, which lowers the pH of the concrete, e.g., from 12 to 7, and lowers the hardness of the C—S—H from approximately 7 Mobs (silica sand) to a hardness of approximately 3 (chalk) and simply washes or is abraded away. Also, below a pH of 9, concrete loses its protective oxidative properties and structural rebar in reinforced concrete is easily corroded, which causes corrosion expansion (spalling) that induces structural failures. Without a barrier to the environment, the C—S—H is attacked by water and atmospheric contaminants that destabilize the C—S—H cement binder, which then destabilizes the concrete mass, leading to structural failures.

Surface deterioration of concrete is becoming a major problem for durability of concrete structures. Surface deteriorations can develop into structural problems, especially in reinforced concrete structural elements. The most efficient way to reduce this deterioration is to prevent liquid ingress into concrete, thus preventing the ingress of chemicals such as carbonic acid, chloride from salts and subsequent deterioration. Also, the coating used to protect the surface should allow the concrete to breath. Otherwise, the coating may delaminate due to hydrostatic pressure and liquid collection within the interior of the concrete, which will expose structural reinforcing steel rebar to corrosive elements.

Conventional organic coatings such as epoxies and polyurethanes used on concrete surfaces readily absorb UV, cannot dissipate surface moisture, cannot chemically bond to concrete, and quickly delaminate. This allows moisture and corrosive chemicals into the concrete, dust and debris gather in the cracks, carbonation begins to occur, and biological growth becomes embedded, staining the concrete and accelerating concrete degradation.

SUMMARY OF THE INVENTION

Inorganic coatings are provided that may be used to coat and protect concrete. The protective inorganic coatings include a liquid composition portion comprising water, an alkali metal oxide component and a silicate-containing component. The coatings also include a powder composition portion comprising microspheres, metal oxide powder and optional microfibers. When applied to concrete, the coatings provide chemical and physical protection.

An aspect of the present invention is to provide a protective inorganic coating composition comprising: a liquid composition portion comprising by weight percent of the liquid composition portion from 50 to 70 weight percent water, from 17 to 27 weight percent of an alkali metal oxide component comprising potassium oxide, and from 18 to 28 weight percent of a silicate-containing component; and a powder composition portion comprising by weight percent of the powder composition portion from 10 to 80 weight percent microspheres, from 1 to 70 weight percent of at least one metal oxide powder comprising a Group II metal, Group IV metal, Group VI metal, Group X metal, Group XII metal or a combination thereof, and up to 50 weight percent microfibers.

Another aspect of the present invention is to provide a method of making a protective inorganic coating composition as described above. The method comprises adding the powder composition portion to the liquid composition portion, and mixing the powder composition portion and the liquid composition portion together.

A further aspect of the present invention is to provide a method of coating concrete by applying a protective inorganic coating as described above to a surface of the concrete.

Another aspect of the present invention is to provide a substrate coated with the protective inorganic coating described above.

These and other aspects of the present invention will be more apparent from the following description.

DETAILED DESCRIPTION

The present invention provides protective inorganic coating compositions comprising: a liquid composition portion comprising by weight percent of the liquid composition portion: from 50 to 70 weight percent water, from 17 to 27 weight percent of an alkali metal oxide component comprising potassium oxide, and from 18 to 25 weight percent of a silicate-containing component; and a powder composition portion comprising by weight percent of the powder composition portion: up to 80 weight percent of microspheres, a Group II metal oxide powder, a Group IV metal oxide powder, a Group VI metal oxide powder, a Group X metal oxide, a Group XII metal oxide powder, and optionally up to 50 weight percent microfibers. In certain embodiments, the liquid composition portion comprises from 52 to 65 weight percent water, from 20 to 24 weight percent alkali metal oxide component, and from 21 to 25 weight percent silicate-containing component, and the powder composition portion comprises from 20 to 50 weight percent microspheres, from 2 to 50 weight percent metal oxide powder, and from 2 to 30 weight percent microfibers. For example, the powder composition portion comprises from 25 to 35 weight percent microspheres, from 4 to 30 weight percent metal oxide powder, and from 4 to 15 weight percent microfibers.

The liquid composition portion may comprise from 10 to 60 weight percent of the total weight of the coating composition, and the powder composition portion may comprise from 40 to 90 weight percent of the total weight of the coating composition. In certain embodiments, the liquid composition portion may comprise from 20 to 50 weight percent of the total weight of the coating composition, and the powder composition portion may comprise from 50 to 80 weight percent of the total weight of the coating composition. For example, the liquid composition portion may comprise from 30 to 40 weight percent of the total weight of the coating composition, and the powder composition portion may comprise from 60 to 70 weight percent of the total weight of the coating composition.

The silicate-containing component may comprise potassium silicate, and may be provided in the form of a water-based solution containing the potassium silicate.

The microspheres may have a particle size from 0.05 to 25 μm, and may comprise at least one material selected from cenospheres, glass, pozzolan, ceramic, and composite.

The Group II metal oxide may be selected from calcium, beryllium, and magnesium oxides. The Group IV metal oxide may be selected from titanium, zirconium and hafnium oxides. The Group VI metal oxide may be selected from molybdenum and tungsten. The Group X metal oxide may be selected from nickel, palladium, platinum. The Group XII metal oxide may comprise zinc and cadmium. Each of the Group II, IV, VI, XII metal oxide may have a maximum particle size of 10 μm, for example, from 0.05 to 5 μm.

The microfibers may comprise wollastonite, carbon, silica, alumina, silicon carbide, or a combination thereof and may have a maximum length of 500 μm and a maximum diameter of 50 μm. For example, the microfibers may have an average aspect ratio of from 2:1 to 5:1, an average length of from 10 to 200 microns, and an average diameter of from 0.1 to 10 microns. The microfibers may comprise from 1 to 30 weight percent of the powder composition portion, for example, from 2 to 20 or from 4 to 15 weight percent of the powder composition portion.

The compositions may further comprise metakaolin in an amount of from 0.1 to 10 weight percent, or from 1 to 5 weight percent, based on the weight of the powder composition portion.

The compositions may include alumina powder having an average particle size of from 50 nanometers to 5 μm in an amount of from 0.1 or 1 up to 5 or 10 weight percent of the powder composition portion.

The compositions may further comprise a sugar in an amount from 0.1 to 1.5 or 2 weight percent of the total composition.

The compositions may further comprise a densifier such as silicic acid in an amount up to 10 weight percent of the total composition, for example, from 0.5 to 5 weight percent, or from 1 to 3 weight percent.

The compositions may further comprise a pigment in an amount of from 0.1 to 10 weight percent based on the total weight of the coating composition. The pigment may be of any known type, such as iron oxide or the like.

The compositions may further comprise at least one additional component selected from carbides, nitrides, borides, silicides, zeolites, or a combination thereof. Such additional components may have a maximum particle size of 25 μm. For example, the additional component may comprise an elongated single crystal whisker.

The protective coatings may be applied to concrete, cement, sand, aggregate, and similar applications to provide chemical and physical protection to surfaces. The coatings protect concrete substrates by sealing the surface from moisture, carbon dioxide, carbonic acid, chloride, and sulfur compounds. Sealing the surface also prevents corrosion of structural reinforcements in the concrete. Also, steel rebar may be coated with the present coatings in order to provide anti-corrosive protection.

The present coatings can be applied to cementitious surfaces, including bridges (decks, substructure), dams, tunnels, garage decks and walls, storm drains, roadways, cinder block walls, sound barrier walls, concrete cast pipes, sewage treatment facilities, waste containment (oil, nuclear) facilities, water treatment facilities, pavers or cast concrete products, pervious pavement, and the like. For more extreme industrial service environments, ceramics may be added to the coating to significantly resist weighted and grating abrasion. Dam spillways, canals, or other infrastructure that experiences erosion can be protected long-term.

The present coatings reduce surface porosity to prevent chlorides and other corrosive elements from entering concrete structures, protecting the embedded steel reinforcement, while still remaining breathable to allow vapor to dissipate, preventing spalling and other deterioration. The present coatings may provide protection for weaker calcium based concrete systems that often are used to create pervious concrete roadways, parking lots and sidewalks. The natural resistance to freeze-thaw cycles, organic growth and self-cleaning properties ensure that these pervious systems will perform better, longer.

The coatings may form an indefinite length branched inorganic polymer that wraps around elements in and on concrete surfaces. Effectively, the coatings form a permanent chemical composite with the surface layer of concrete, stabilizing the calcium, silicate, and water of hydration from destabilization and deterioration.

The present protective inorganic coatings are less permeable than concrete, but still allow the concrete to breathe. The coatings may reduce or eliminate ingress of corrosive chemicals, which reduces or prevents deterioration of concrete. The coatings may be used to seal and colorize, protect from chloride, carbonation and abrasion; prevent algae and fungi growth; self-clean; reflect light and heat; provide infinite reparability; UV stable, does not fade; non-toxic, water based.

The present coatings can protect from chemical attack and abrasion, can be used to repair concrete surfaces, and provide increased durability. The coatings may be used to chemically stabilize the pH of the concrete surfaces. Coating of concrete, including its cement, sand and aggregate components provides abrasion resistance. The coatings are able to attach to the C—S—H cement binder, sand and aggregate to form a durable, long-lasting coating that prevents carbonation, chemical ingress and abrasion, thus preventing both chemical and physical deterioration of concrete. The present coatings can also be reinforced with particles such as advanced ceramic elements to provide extreme hardness and abrasion resistance, providing an extremely durable surface.

The coatings may be self-cleaning, surface-oxidative, and immune to microbial growth, which ruins the appearance of concrete structures and degrades them with organic acids over time. The present coatings may provide multiple mechanisms for self-cleaning, including photocatalytic anti-microbial; metal oxidative anti-microbial; and particle (dust) repulsion. The present coatings may be naturally self-cleaning and can be adjusted to have increased self-cleaning properties as desired for the end use. For instance, these properties can be used to help prevent microbial contamination in food manufacturing facilities, hospitals, and other facilities that are sensitive to microbial contamination. Or they can be enhanced to prevent issues including microbially induced corrosion (MIC) associated with sewage and storm infrastructure. The present coatings may be biologically impervious by creating a dense, non-nutrient, non-habitat, oxidative surface that prevents microbial colonization. The present coatings may provide self-cleaning photocatalytic characteristics which provide protection of the surface from microscopic and macroscopic biological infection, e.g., by an oligodynamic effect. This property provides the advantages of maintaining a clean surface, devoid of algae and other common surface staining, and reduced maintenance costs.

The present coatings may absorb strongly in the UVA range that is considered safe for the presence of humans and other creatures, in the range of 350 to 400 nm. UVA exposure is commonly used to reduce bacteria and viruses on concrete and other surfaces. The present coatings may use one or more of the metal oxide species described herein in cooperation to absorb light in the near infra-red, visible light, and UV spectrum. The type of metal oxides can be added to absorb the light frequencies that produce a desired outcome, including surface sterilization, generating electrons, and heating the surface.

The coatings can utilize two or more oxides in tandem to create increased catalytic properties. In certain embodiments, nano-alumina and zirconia silicates are used in the coating compositions to penetrate, renew, and preserve concrete surfaces. This can slow down or stop attack from chlorides, carbonation, and abrasion that are the main causes of concrete decay. The ceramic coatings chemically bond to concrete, creating a hard, durable and permanent surface barrier to environmental attack. The coatings can be used for interior or exterior concrete surfaces.

The present coatings can act as surface bonding agents between two cementitious layers that would otherwise not bond to each other. Furthermore, the present coatings can act as an adhesion promoting primers for other coatings.

The present coatings may be used to produce various colors, textures, and finishes to concrete. The coatings may be colorized for beautification or practical purposes. For instance, a white reflective coating may reflect automobile headlight, starlight, and moonlight to provide drivers with better visual cues at night for safer driving. The colors may be inorganic, UV stable and fade resistant.

The present coatings may meet LEED Ultra Low-VOC guidelines, and are non-toxic to workers and the environment.

The following examples are intended to illustrate various aspects of the present invention, and are not intended to limit the scope of the invention.

Example 1

A coating composition consisting of three components is prepared: liquid, powder, and densifier. The liquid is made by blending a silicate-containing solution and potassium hydroxide flakes in water to create a binder solution. The powder is made by mixing the various raw components listed above. Pozzolan microspheres represent 45-50% of the powder, by weight. Metakaolin represents 1-5% of the powder, by weight. Titanium, zirconium, hafnium, and aluminum oxides represent 25-30% of the powder, by weight. Microfiber composed of wollastonite represents 5-10% of the powder, by weight. Zinc oxide represents 5-10% of the powder, by weight. Discrete carbon fibers represent 5-10% of the powder, by weight. Densifier consisting of silicic acid is added to the liquid and powder at 1-5%, by weight.

Example 2

A coating composition comprising the components of Example 1 is prepared with 0.1-10% iron oxide added, by weight.

Example 3

A coating composition comprising the components of Example 1 is prepared with 0.1-10% silicon carbide in the form of whiskers added, by weight.

Example 4

A coating composition comprising the components of Example 1 is prepared by mixing the liquid, powder, and densifier components in either a high or low shear mixer (such as a paint mixing drill bit) to form a low-viscosity solution that can be applied to the surface of concrete. The coating composition is applied to concrete surfaces either by brush, roller, sprayer, or any other method typically used to apply coatings.

Example 5

A coating composition comprising the components of Example 1 is applied to concrete and allowed to dry, harden and cure at room temperature on the concrete surface.

Example 6

A coating composition comprising the components of Example 1 is applied to interior and exterior cinderblock walls. This reduces the porosity of the surfaces, chemically stabilizes the surfaces to prevent the loss of calcium oxide (efflorescence) and carbonation, creates a self-cleaning and microbially impervious surface and creates an aesthetically pleasing surface. The coating surface resists algae and fungal growth and is easy to clean.

Example 7

A coating composition comprising the components of Example 1 is applied to an industrial concrete floor. This reduces the porosity of the surface, stabilizes the surface to prevent degradation, protects the concrete from dirt and chemical ingress, creates a surface resistant to abrasion, creates an aesthetically pleasing surface and creates an anti-slip surface.

Example 8

A coating composition comprising the components of Example 1 is applied to concrete walls and floor of a dairy. This reduces the porosity of the surfaces, stabilizes the surfaces to prevent degradation, protects the concrete from feces and chemical ingress and excess moisture, creates a self-cleaning and microbially impervious surface, creates a surface resistant to abrasion, creates an aesthetically pleasing surface and creates an anti-slip surface. The coating surface resists microbial growth and is easy to clean.

Example 9

A coating composition comprising the components of Example 1 is applied to concrete walls and floor of a food processing facility. This reduces the porosity of the surfaces, stabilizes the surfaces to prevent degradation, protects the concrete from food debris and chemical ingress and excess moisture, creates a self-cleaning and microbially impervious surface, creates surfaces resistant to abrasion, creates aesthetically pleasing surfaces, and creates anti-slip surfaces. The coating surface resists microbial growth, and is easy to clean.

Example 10

A coating composition comprising the components of Example 1 is applied to concrete walls and floor of a clean room. This reduces the porosity of the surfaces, prevents contaminant ingress, chemically stabilizes the surfaces, creates self-cleaning and microbially impervious surfaces, and creates aesthetically pleasing surfaces. The coating surfaces resist microbial growth and are easy to clean.

Example 11

A coating composition comprising the components of Example 1 is applied to precast concrete. This reduces the porosity of the surface, stabilizes the surface to prevent degradation, protects the concrete from salt and other chemical ingress and excess moisture, creates a self-cleaning and microbially impervious surface, creates a surface resistant to abrasion, creates an aesthetically pleasing surface and creates an anti-slip surface. The coating surface resists microbial growth and is easy to clean.

Example 12

A coating composition comprising the components of Example 1 is applied to a repaired concrete surface. This reduces the porosity of the surface, stabilizes the surface to prevent degradation of the existing concrete and repair materials, protects the concrete from chemical ingress and excess moisture, creates a self-cleaning and microbially impervious surface, creates a surface resistant to abrasion, creates an aesthetically pleasing surface, and creates an anti-slip surface.

Example 13

Physical testing results for coated concrete substrates are listed in Table I below. The coating composition included three components: liquid, powder, and densifier. The liquid portion is blend of a silicate-containing water-based solution 70% by weight, potassium hydroxide flakes 10% by weight, and water 20% by weight. The silicate-containing solution comprises about 61 weight percent water and about 39 weight percent potassium silicate and a combination of silicic acid and potassium salt, and is commercially available under the designation KASIL 6 Potassium Silicate Solution from PQ Corporation. The water contained in the silicate-containing solution and the separately added water provide a total water content of about 58 weight percent of the liquid portion. The powder portion is made by mixing pozzolan microspheres 45% by weight, metakaolin 3% by weight, zirconium oxide 25% by weight, zinc oxide 7% by weight, titanium dioxide 5% by weight, aluminum oxide 2% by weight, microfiber wollastonite 6% by weight, discrete carbon fibers 7% by weight. The densifier is silicic acid 100% by weight. The final composition comprises 32% by weight of the liquid portion, 67% by weight of the powder portion, and 1% by weight of the silicic acid densifier.

TABLE 1

PHYSICAL TESTING

| | |
|---|---|
| Dry Film Thickness | 4-8 Mils (100-200 Microns) |
| Adhesion (Direct Pull-Off) (ASTM D4541) | >1000 PSI (concrete failed) |
| Thermal Expansion | Concrete Compatible |
| Thermal Cycling (ASTM D6944) | No Checking Occurred No Cracking Occurred No Blistering Occurred |
| Hardness, Shore D (ASTM D2240) | 90.0 ± 5.0 |
| UVA/B 370 nmλ | No Chalking Occurred |
| UVC 200 nmλ | No Cracking Occurred No Delamination Occurred |
| High Temperature Service | 2000° F. (No Degradation) |
| Fire Rating (ASTM E84 - 15b) | Zero (0) Flame Spread |
| Smoke Generation (AS TM E84 - 15b) | Zero (0) Smoke |

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, a coating composition "deposited onto" a substrate does not preclude the presence of one or more other intervening coating layers of the same or different composition located between the coating composition and the substrate.

Whereas particular embodiments of this invention have been described above for purposes of illustration, it will be evident to those skilled in the art that numerous variations of the details of the present invention may be made without departing from the invention as defined in the appended claims.

What is claimed is:

1. A protective inorganic coating composition comprising:
   a liquid composition portion comprising by weight percent of the liquid composition portion: from 50 to 70 weight percent water, from 17 to 27 weight percent of an alkali metal oxide component comprising potassium oxide, and from 18 to 28 weight percent of a silicate-containing component; and
   a powder composition portion comprising by weight percent of the powder composition portion: from 25 to 35 weight percent microspheres comprising pozzolan, from 4 to 30 weight percent of at least one metal oxide powder comprising a Group II metal, Group IV metal, Group VI metal, Group X metal, Group XII metal or a combination thereof, and from 4 to 15 weight percent microfibers.

2. The protective inorganic coating composition of claim 1, wherein the water comprises from 52 to 65 weight percent, the alkali metal oxide component comprises from 20 to 24 weight percent, and the silicate-containing component comprises from 21 to 25 weight percent.

3. The protective inorganic coating composition of claim 1, wherein the silicate-containing component comprises potassium silicate.

4. The protective inorganic coating composition of claim 1, wherein the liquid composition portion comprises from 10 to 60 weight percent of the total weight of the protective inorganic coating composition, and the powder composition portion comprises from 40 to 90 weight percent of the total weight of the protective inorganic coating composition.

5. The protective inorganic coating composition of claim 1, wherein the liquid composition portion comprises from 20 to 50 weight percent of the total weight of the protective inorganic coating composition, and the powder composition portion comprises from 50 to 80 weight percent of the total weight of the protective inorganic coating composition.

6. The protective inorganic coating composition of claim 1, wherein the liquid composition portion comprises from 30 to 40 weight percent of the total weight of the protective inorganic coating composition, and the powder composition portion comprises from 60 to 70 weight percent of the total weight of the protective inorganic coating composition.

7. The protective inorganic coating composition of claim 1, wherein the microspheres have an average particle size of from 0.05 to 25 microns.

8. The protective inorganic coating composition of claim 1, wherein the microspheres further comprise at least one material selected from cenospheres, glass, ceramic, or a combination thereof.

9. The protective inorganic coating composition of claim 1, wherein the microspheres further comprise cenospheres, ceramic, or a combination thereof.

10. The protective inorganic coating composition of claim 1, wherein the at least one metal oxide powder has a maximum particle size of 10 microns.

11. The protective inorganic coating composition of claim 1, wherein the at least one metal oxide powder has an average particle size of from 0.05 to 5 microns.

12. The protective inorganic coating composition of claim 1, wherein the Group II metal oxide is selected from calcium, beryllium, and magnesium oxides, the Group IV metal oxide is selected from titanium, zirconium, and hafnium oxides, the Group VI metal oxide is selected from molybdenum and tungsten oxides, the Group X metal oxide is selected from nickel, palladium, and platinum oxides, and the Group XII metal oxide is selected from zinc and cadmium oxides.

13. The protective inorganic coating composition of claim 1, wherein the microfibers have an average aspect ratio of at least 2:1, a maximum length of 500 microns, and a maximum diameter of 50 microns.

14. The protective inorganic coating composition of claim 1, wherein the microfibers have an average aspect ratio of from 2:1 to 5:1, an average length of from 10 to 200 microns, and an average diameter of from 0.1 to 10 microns.

15. The protective inorganic coating composition of claim 1, wherein the microfibers comprise wollastonite, silica, alumina, carbon, and silicon carbide or a combination thereof.

16. The protective inorganic coating composition of claim 1, wherein the microfibers comprise wollastonite, carbon or a combination thereof.

17. The protective inorganic coating composition of claim 1, wherein the powder composition portion further comprises metakaolin.

* * * * *